US008247975B2

(12) United States Patent
Yoo et al.

(10) Patent No.: US 8,247,975 B2
(45) Date of Patent: Aug. 21, 2012

(54) BACKLIGHT ASSEMBLY FOR LIQUID CRYSTAL DISPLAY DEVICE

(75) Inventors: Yeon-Taek Yoo, Gyeongsangbuk-do (KR); Ki-Ho Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 446 days.

(21) Appl. No.: 12/585,606

(22) Filed: Sep. 18, 2009

(65) Prior Publication Data

US 2010/0195024 A1 Aug. 5, 2010

(30) Foreign Application Priority Data

Feb. 3, 2009 (KR) ............................ 2009-0008229
May 1, 2009 (KR) ............................ 2009-0038640

(51) Int. Cl.
*G09G 3/36* (2006.01)
*G02F 1/13357* (2006.01)
*H05B 41/14* (2006.01)
*H05B 37/02* (2006.01)

(52) U.S. Cl. ............ 315/51; 315/189; 315/297; 349/69

(58) Field of Classification Search .................... 315/51, 315/189, 297, 307; 349/69
See application file for complete search history.

(56) References Cited

U.S. PATENT DOCUMENTS

| | | | | |
|---|---|---|---|---|
| 7,847,783 B2 * | 12/2010 | Liu et al. | ........................ | 345/102 |
| 2007/0013620 A1 * | 1/2007 | Tanahashi et al. | .............. | 345/82 |
| 2008/0061716 A1 * | 3/2008 | Kim et al. | ..................... | 315/307 |
| 2008/0136769 A1 * | 6/2008 | Kim et al. | ..................... | 345/102 |

FOREIGN PATENT DOCUMENTS

CN 101144936 3/2008

OTHER PUBLICATIONS

Chinese Office Action dated Nov. 15, 2011, issued in a corresponding Chinese Patent Application.

* cited by examiner

*Primary Examiner* — Daniel D Chang
(74) *Attorney, Agent, or Firm* — Morgan, Lewis & Bockius LLP

(57) ABSTRACT

A backlight assembly for a liquid crystal display device including an LED backlight unit including a plurality of light emitting diode strings coupled to a plurality of current balancing circuits, a backlight driver including a light emitting diode driver that supplies current to the light emitting diode strings, and a connector electrically connecting the plurality of current balancing circuits to the light emitting diode driver.

12 Claims, 4 Drawing Sheets

BACKLIGHT ASSEMBLY FOR LIQUID CRYSTAL DISPLAY DEVICE

The present invention claims the benefit of Korean Patent Application No. 10-2009-0008229 filed in Korea on Feb. 3, 2009 and Korean Patent Application No. 10-2009-0038640 filed in Korea on May 1, 2009, each of which is hereby incorporated by reference.

BACKGROUND OF THE INVENTION

1. Field of the Invention

The present invention relates to a liquid crystal display device, and more particularly, to a backlight assembly for a liquid crystal display device that reduces the number of electrical connectors and wires connecting a light emitting diode (LED) backlight unit to a backlight driver.

2. Discussion of the Related Art

Today, liquid crystal display devices have been incorporated into many devices due to their light weight, thinness, and low power consumption. Accordingly, liquid crystal display devices are used in office automation apparatuses and audio/video apparatuses.

The liquid crystal display device typically includes a light source, such as a backlight unit. There are various types of backlight units depending on the position of the light source in relation to the liquid crystal display panel.

There are direct lighting type and edge lighting type backlight units. The direct lighting type backlight unit has a plurality of light sources under the liquid crystal display panel for directing light from the light sources to a liquid crystal display panel through a diffusion plate and a plurality of optical sheets. The edge lighting type backlight unit has a light source mounted to one side edge of the liquid crystal display panel for directing light from the light source to a liquid crystal display panel through a light guide plate and a plurality of optical sheets.

Recently, use of a backlight assembly having LEDs has increased. The backlight assembly with LEDs is provided with an LED backlight unit having LEDs arranged thereon, and a backlight driver for driving the LED backlight unit. Since the LED backlight unit and the backlight driver are formed on individual printed circuit boards, the LED backlight unit and the backlight driver are electrically connected with connectors and wires. As the number of connectors is proportional to the number of LED strings formed on the LED backlight unit, and the connectors are expensive components of the backlight assembly, the large number of connectors and wires increase the production cost of the liquid crystal display device.

SUMMARY OF THE INVENTION

Accordingly, the present invention is directed to a backlight assembly for a liquid crystal display device that substantially obviates one or more of the problems due to limitations and disadvantages of the related art.

An object of the present invention is to provide a cost effective backlight assembly with LEDs for a liquid crystal display device.

Another object of the present invention is to provide of a backlight assembly for a liquid crystal display device that reduces the number of electrical connectors and wires between an LED backlight unit and a backlight driver.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the backlight assembly for a liquid crystal display device includes a backlight assembly for a liquid crystal display device including an LED backlight unit including a plurality of light emitting diode strings coupled to a plurality of current balancing circuits, a backlight driver including a light emitting diode driver that supplies current to the light emitting diode strings, and a connector electrically connecting the plurality of current balancing circuits to the light emitting diode driver.

In another aspect, the backlight assembly for a liquid crystal display device includes a backlight assembly for a liquid crystal display device including a plurality of LED backlight units, each LED backlight unit including a plurality of light emitting diode strings coupled to a plurality of current balancing circuits, a backlight driver including a light emitting diode driver that supplies current to the light emitting diode strings, and a plurality of connectors electrically connecting the plurality of current balancing circuits to the light emitting diode driver, wherein each of the plurality of connectors is disposed between each of the plurality of LED backlight units and the light emitting diode driver.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
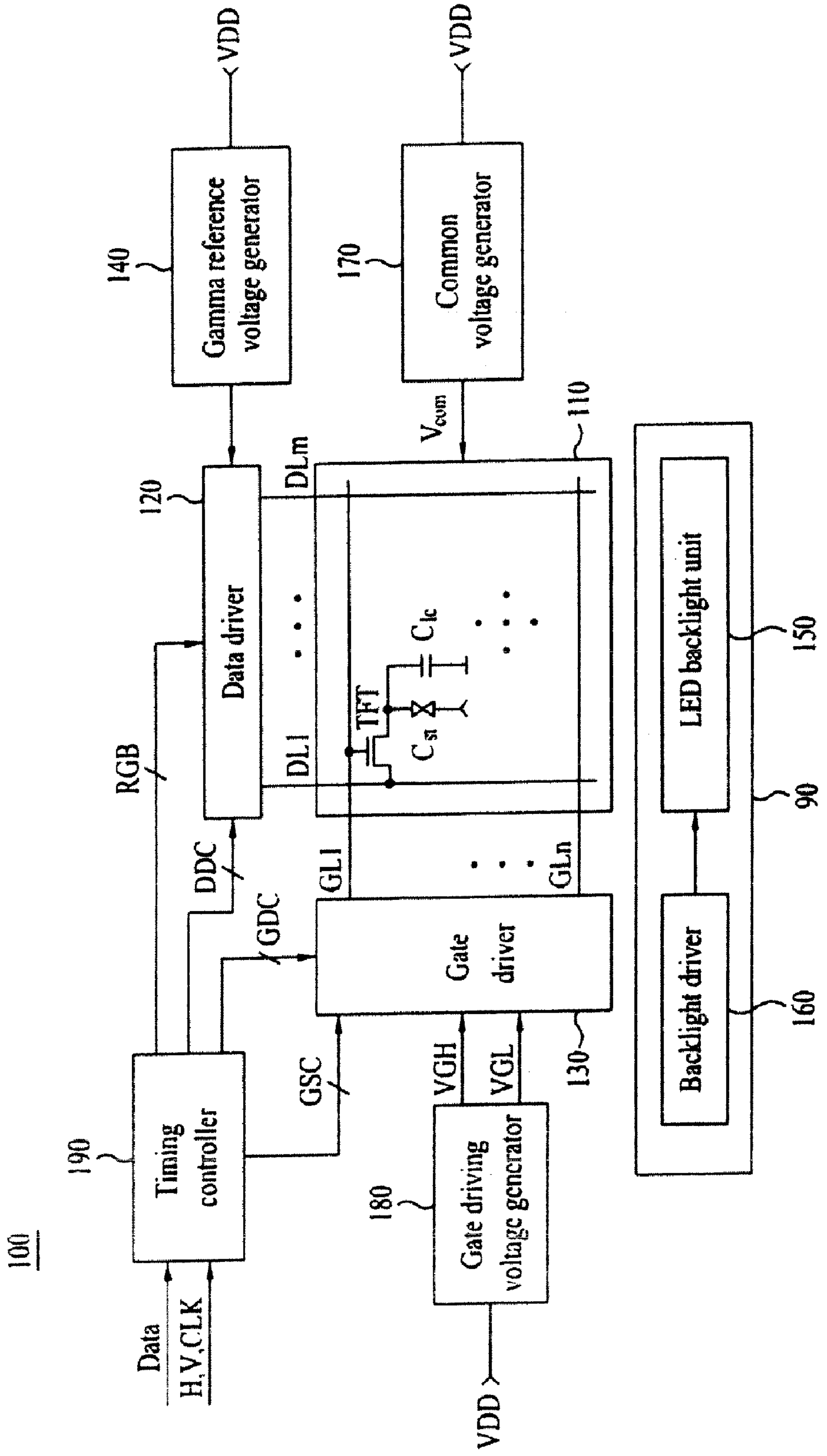
FIG. 1 illustrates an exemplary block diagram of a liquid crystal display device in accordance with the present invention.

FIG. 1 illustrates an exemplary block diagram of a liquid crystal display device in accordance with the present invention.

As shown in FIG. 1, the liquid crystal display device 100 includes a liquid crystal display panel 110, backlight assembly 90, data driver 120, gate driver 130, gamma reference voltage generator 140, common voltage generator 170, gate driving voltage generator 180, and timing controller 190. Liquid crystal display panel 110 has data lines DL1 to DLm and gate lines GL1 to GLn which cross each other such that a thin film transistor TFT is formed at each crossing portion thereof to drive respective liquid crystal cells Clc. Data driver 120 supplies data to data lines DL1 to DLm. Gate driver 130 supplies a scan pulse to the gate lines GL1 to GLn. Gamma reference voltage generator 140 generates and supplies a gamma reference voltage to the data driver 120. Backlight assembly 90 directs light to the liquid crystal display panel 110. Common voltage generator 170 generates and supplies a common voltage Vcom to a common electrode of the liquid crystal cells Clc in the liquid crystal display panel 110. Gate driving voltage generator 180 generates and supplies a gate high voltage VGH and a gate low voltage VGL to the gate driver 130. Timing controller 190 controls the data driver 120 and gate driver 130.

Liquid crystal display panel 110 has two glass substrates between which liquid crystals are injected. Data lines DL1 to DLm and gate lines GL1 to GLn are formed on a lower glass substrate of the liquid crystal display panel 110 and are formed to cross each other. At each crossing point of the data lines DL1 to DLm and gate lines GL1 to GLn, there is the TFT formed thereon. The TFT supplies data from the data lines DL1 to DLm to the liquid crystal cells Clc in response to the scan pulse. The TFT has a gate electrode connected to the corresponding one of the gate lines GL1 to GLn, a source electrode connected to the corresponding one of data line DL1 to DLm, and a drain electrode connected to a pixel electrode and a storage capacitor Cst of the liquid crystal cell Clc.

The TFT is turned on in response to the scan pulse supplied to the gate electrode via the gate lines GL1 to GLn. When the TFT is turned on, video data is supplied from the data lines DL1 to DLm to the liquid crystal cell Clc.

Data driver 120 supplies data to data lines DL1 to DLm in response to a data driver control signal DDC. The data driver 120 samples and latches digital video data RGB from the timing controller 190 and converts the sampled and latched digital video data RGB into an analog data voltage which can express a gray scale at the liquid crystal cell Clc in the liquid crystal display panel 110. With reference to the gamma reference voltage from the gamma reference voltage generator 140, the data driver 120 supplies the analog data voltage to the data lines DL1 to DLm.

Gate driver 130 generates successive scan pulses, i.e., gate pulses, in response to a gate driving signal GDC and a gate shift clock GSC from the timing controller 190. Gate driver 130 supplies the scan pulses to the gate lines GL1 to GLn. Gate driver 130 sets a high level voltage and a low level voltage of each of the scan pulses according to the gate high voltage VGH and the gate low voltage VGL from the gate driving voltage generator 180.

Gamma reference voltage generator 140 receives a highest power voltage VDD among power voltages being supplied to the liquid crystal display panel 110. Gamma reference voltage generator 140 then generates and supplies a positive polarity reference voltage and a negative polarity reference voltage to the data driver 120.

Common voltage generator 170 receives the highest power voltage VDD. Common voltage generator 170 then generates and supplies the common voltage Vcom to the common electrode of the liquid crystal cells Clc at respective pixels of the liquid crystal display panel 110.

Gate driving voltage generator 180 receives the highest voltage VDD. Gate driving voltage generator 180 then generates and supplies the gate high voltage VGH and the gate low voltage VGL to the gate driver 130. Gate driving voltage generator 180 generates the gate high voltage VGH higher than a threshold voltage of the TFT at each pixel of the liquid crystal display panel 110, and the gate low voltage VGL lower than the threshold voltage of the TFT. Gate high voltage VGH and gate low voltage VGL are used for setting a high level voltage and a low level voltage of the scan pulse generated by the gate driver 130, respectively.

Timing controller 190 supplies the digital video data RGB from a digital video card (not shown) to the data driver 120. In addition, timing controller 190 generates the data driving control signal DDC and the gate driving control signal GDC by using horizontal/vertical synchronizing signals according to a clock signal CLK. Timing controller 190 then supplies the data driving control signal DDC and the gate driving control signal GDC to the data driver 120 and the gate driver 130, respectively. The data driving control signal DDC includes a source shift clock SSC, a source start pulse SSP, a polarity control signal POL and a source output enable signal SOE. The gate driving control signal GDC includes a gate start pulse GSP and a gate output enable GOE.

Backlight assembly 90 includes a LED backlight unit 150 and a backlight driver 160. LED backlight unit 150 has a plurality of light emitting diodes (LEDs) for emitting the light to the pixels in the liquid crystal display panel 110. Backlight driver 160 supplies light emission current and voltage to the LED backlight unit 150.

Figure 2:
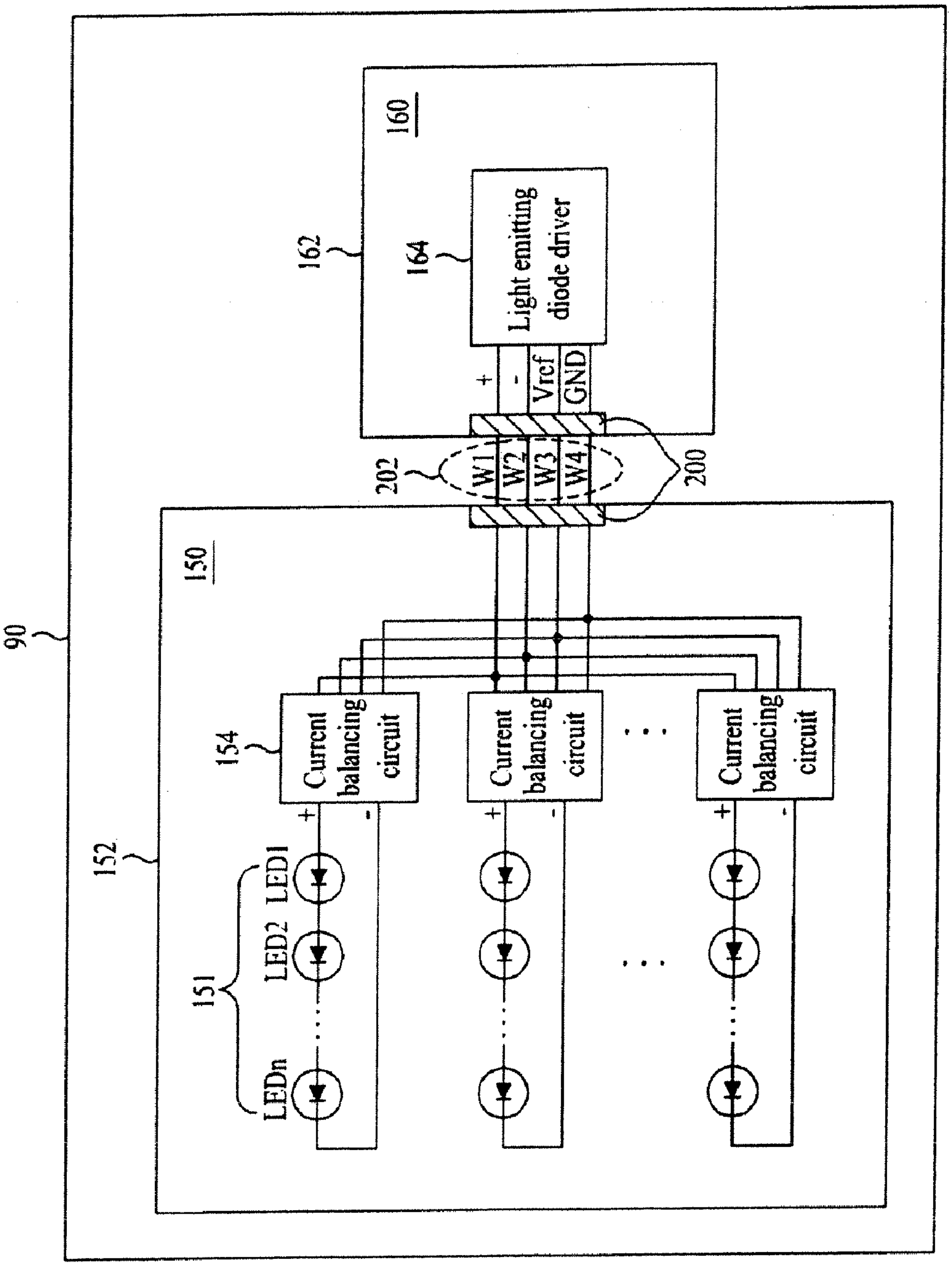
FIG. 2 illustrates an exemplary block diagram of a backlight assembly in accordance with a first embodiment of the present invention.

FIG. 2 illustrates an exemplary block diagram of a backlight assembly in accordance with a first embodiment of the present invention.

As shown in FIG. 2, backlight assembly 90 has a LED backlight unit 150 and a backlight driver 160. LED backlight unit 150 has a plurality of light emitting diodes (LEDs) arranged behind the liquid crystal display panel 110 for emitting light to the pixels in the liquid crystal display panel 110. Backlight driver 160 supplies light emission current and voltage to the LED backlight unit 150. LED backlight unit 150 and backlight driver 160 are positioned separately on individual printed circuit boards and are connected electrically to each other with a connector 200.

The backlight assembly 90 for a liquid crystal display device in accordance with a first embodiment of the present invention will be described with reference to FIGS. 2 and 3.

As shown in FIG. 2, LED backlight unit 150 includes a plurality of light emitting diode strings 151 on a first printed circuit board PCB 152. Each of the light emitting diode strings 151 has a plurality of light emitting diodes LED1~LEDn connected in series. A plurality of current balancing circuits 154 is matched one to one with the plurality of light emitting diode strings 151. Each current balancing circuit 154 substantially uniformly supplies current from the backlight driver 160 to the light emitting diode strings 151.

Backlight driver 160 includes a light emitting diode driver 164 on a second printed circuit board PCB 162. As shown in FIG. 3, the backlight driver 160, including the light emitting diode driver 164, receives a light emitting diode driving voltage from a system driver 280.

Figure 3:
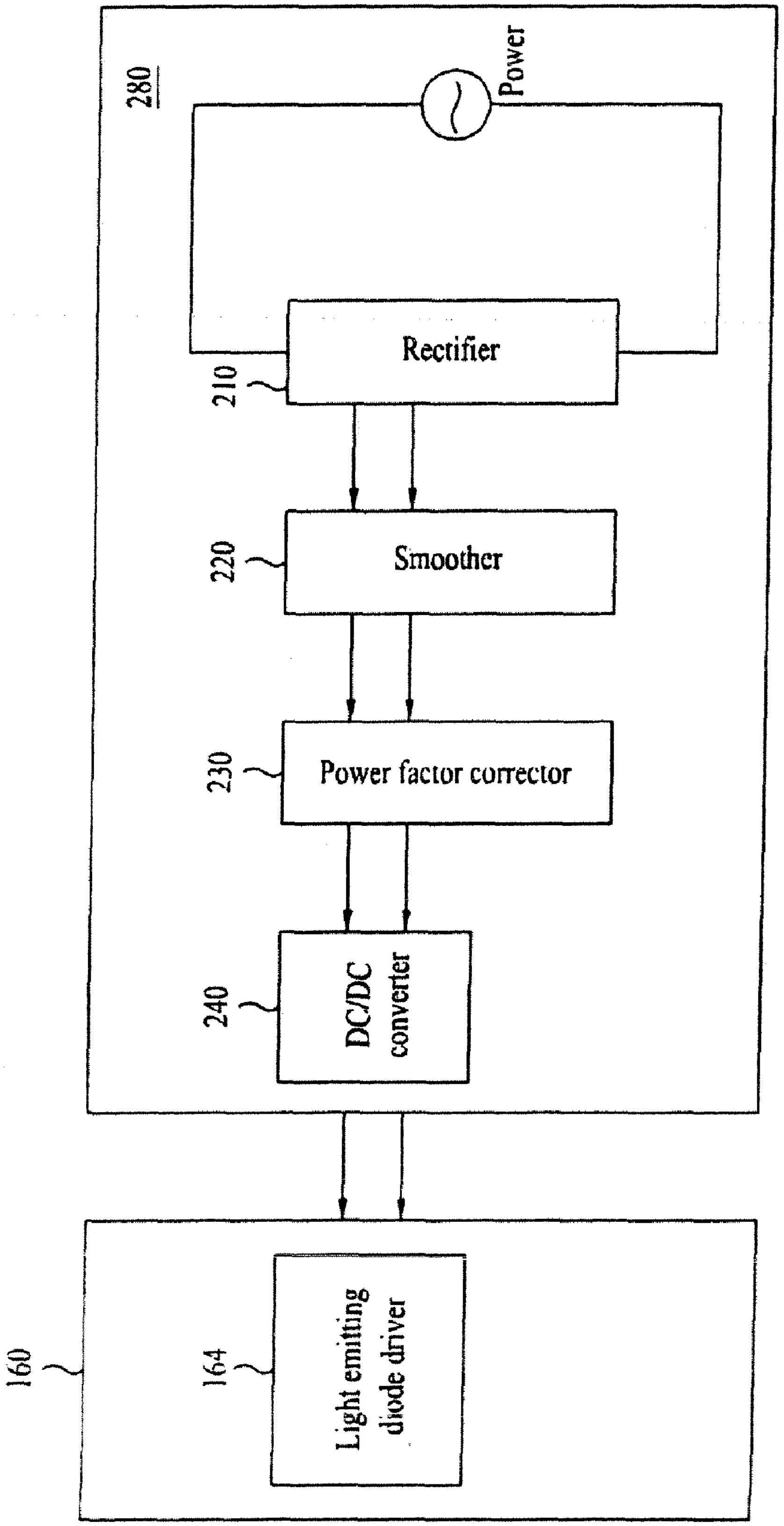
FIG. 3 illustrates an exemplary block diagram of the light emitting diode driver in FIG. 2 and the system driver.

The system driver 280 shown in FIG. 3 includes a rectifier 210, smoother 220, power factor corrector 230, and DC/DC converter 240. Rectifier 210 converts a utility power (for an example, an AC voltage) to a DC voltage. Smoother 220 removes ripples from the DC voltage supplied by the rectifier 210. Power factor corrector 230 corrects a power factor of the DC voltage from the smoother 220 to output a DC voltage, for example, 400V. The DC/DC converter 240 converts the DC 400V from the power factor corrector 230 into a DC voltage, for example, 24V.

Rectifier 210 converts the utility power (for example, AC 220V) into a DC voltage and supplies the DC voltage to the smoother 220. Since a voltage is pulled up in a rectifying process, if the utility power is AC 220V, about DC 331V will be supplied to the smoother 220.

Smoother 220 removes ripples from the DC voltage (DC 331V) and applies only the DC component, i.e., DC 331V, to the power factor corrector 230. In other words, the smoother 220 passes only the DC component and absorbs and removes the AC component in the smoothing process.

Power factor corrector 230 corrects a power factor of the DC voltage of DC 331V from the smoother 220 to remove a phase difference between the voltage and the current. The power factor corrector 230 also supplies the DC 400V to the DC/DC converter 240. Since the utility power is different from one country to another country, power factor corrector 230 is provided for supplying a fixed DC voltage of DC 400V to the DC/DC converter 240 regardless of the utility power.

DC/DC converter 240 converts the DC 400V from the power factor corrector 230 to DC 24V. The DC/DC converter 240 also supplies the DC 24V to the backlight driver 160.

Light emitting diode driver 164 in the backlight driver 160 converts the DC 24V from the DC/DC converter 240 into a voltage (for example, DC 35V) required to drive the LEDs. Light emitting diode driver 164 also supplies a light emitting current required for the LEDs to emit light to the current balancing circuits 154 through the connector 200.

Since the current balancing circuits 154 are included in the LED backlight unit 150 not in the backlight driver 160, the current from the light emitting diode driver 164 in the backlight driver 160 passes only through connector 200. As a result, the backlight assembly 90 of the present invention can substantially reduce the number of connectors and wires. As shown in FIG. 2, the current balancing circuits 154 are connected to one connector 200 in parallel. That is, the connector 200 is electrically connected between the current balancing circuits 154 and the light emitting diode driver 164. Therefore, the light emitting current from the light emitting diode driver 164 is supplied to the plurality of current balancing circuits 154 which are connected in parallel, with the current divided after the current passes through the connector 200. The current balancing circuits 154 make current intensities substantially uniform by using reference voltages Vref and ground voltages GND before supplying the currents to the respective light emitting diode strings 151. The currents from the light emitting diode strings 151 are fed back to the light emitting diode driver 164 through the connector 200. The backlight assembly 90 for a liquid crystal display device of the present invention enables electric connection between the backlight driver 160 and the LED backlight unit 150 with only one connector 200. As a result, the cost compared to the related art can be substantially reduced.

The reference voltage Vref and the ground voltage GND from the light emitting diode driver 164 to the LED backlight unit 150 can also be supplied through the connector 200. Accordingly, the wire lines 202 used for the connector 200 can also be minimized. Wire lines 202 required for electrically connecting the light emitting diode driver 164 to the LED backlight unit 150 are a first wire line W1, a second wire line W2, third wire line W3, and fourth wire line W4. First wire line W1 passes current for the light emitting diodes to emit lights. Second wire line W2 passes current from the light emitting diode strings back to the light emitting diode driver 164. Third wire line W3 supplies the reference voltage Vref. Fourth wire line W4 supplies the ground voltage GND. Accordingly, a substantially smaller number of wire lines are used compared to the related art. As a result, the cost required for fabrication of the backlight assembly for a liquid crystal display device can be significantly reduced.

The backlight assembly 90 for a liquid crystal display device in FIG. 2 shows an embodiment in which one printed circuit board 152 is used. However, as liquid crystal display devices become larger, there is physical limit in mounting an adequate number of light emitting diode strings 151 and current balancing circuits 154 on one printed circuit board.

Figure 4:
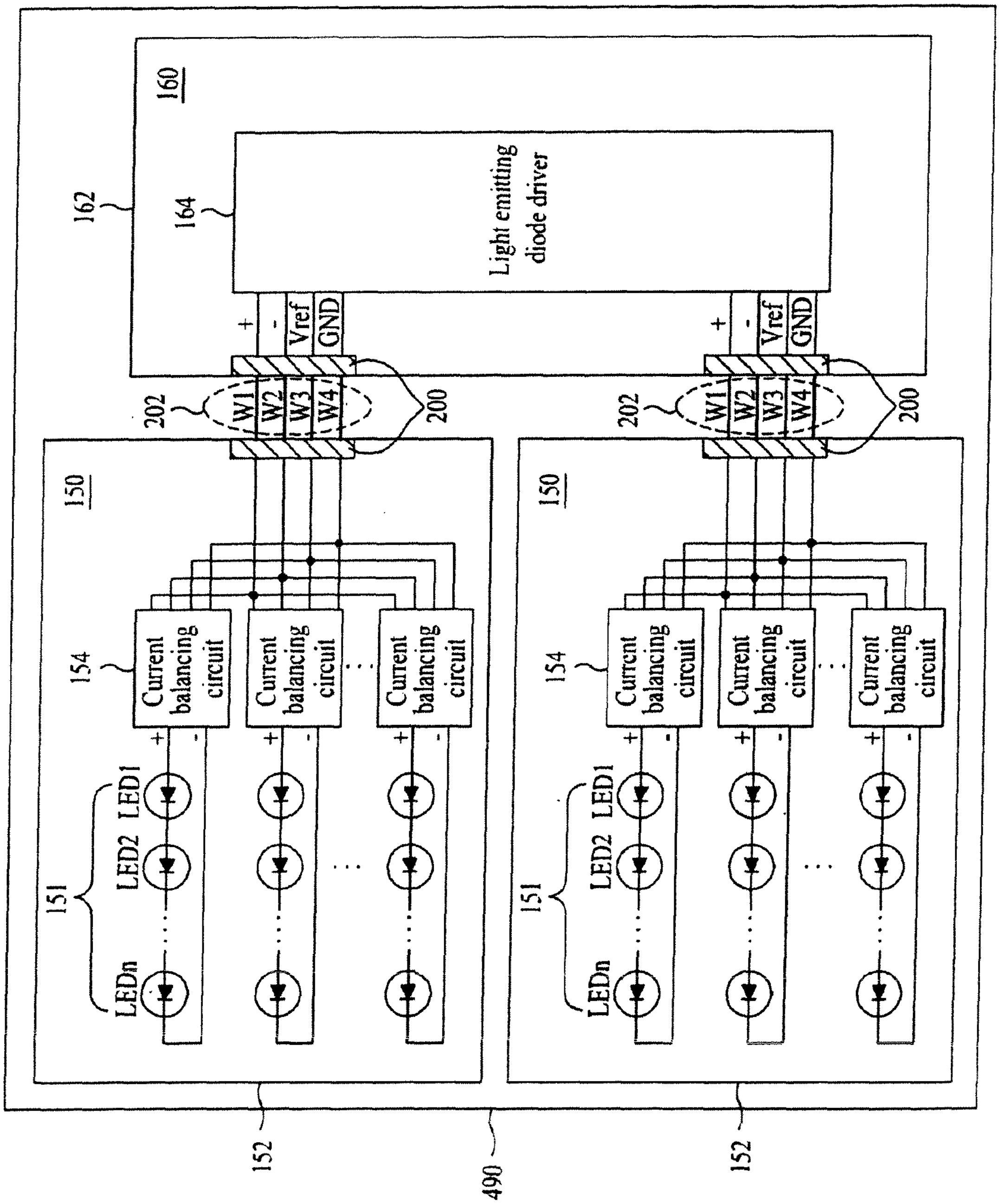
FIG. 4 illustrates an exemplary block diagram of a backlight assembly in accordance with a second embodiment of the present invention.

FIG. 4 illustrates an exemplary block diagram of a backlight assembly for a liquid crystal display device in accordance with a second embodiment of the present invention. The second embodiment is typically applicable to larger liquid crystal display devices.

As shown in FIG. 4, the backlight assembly of the second embodiment is identical to the backlight assembly of the first embodiment except that the backlight assembly of the second embodiment includes a plurality of LED backlight units 150 each of which is positioned on a separate first printed circuit boards 152. In addition, each of the plurality of LED backlight units 150 is individually connected to the light emitting diode driver 164 by one of a plurality of the connectors 200. Accordingly, in the second embodiment, there are equal numbers of LED backlight units 150, first printed circuit boards 152, and connectors 200.

As shown in FIG. 4, the backlight assembly 490 includes a plurality of LED backlight units 150 and a backlight driver 160. Each of the plurality of LED backlight units 150 is formed on one of a plurality of first printed circuit boards 152. The backlight driver 160 supplies light emitting currents and voltages to the plurality of LED backlight units 150. Also, a plurality of connectors 200 electrically connects current balancing circuits 154 of the LED backlight units 150 with the light emitting diode driver 164.

Although FIG. 4 illustrates only two LED backlight units 150 positioned on two first printed circuit boards 152, the number of the LED backlight units 150 and first printed circuit boards 152 are not limited to two. Instead, additional LED backlight units 150 positioned on additional first printed circuit boards 152 can be employed to accommodate larger screens of larger liquid crystal display devices.

In the backlight assembly for a liquid crystal display device in accordance with the second embodiment of the present invention, the first printed circuit boards 152 each having one LED backlight unit 150 formed thereon are electrically connected to the second printed circuit board 162 having a backlight driver 160 formed thereon with individual connectors 200. Each of the LED backlight units 150 and the connectors 200 are identical to those of the first embodiment of the present invention. Accordingly, the second embodiment of the present invention maintains objects and advantages of the first embodiment of the present invention, and provides a larger backlight assembly applicable to a larger screen.

As has been described, the backlight assembly for a liquid crystal display device of the present invention has the following advantages. The electrical connection between the LED backlight unit 150 and the backlight driver 160 with one connector 200 reduces the number of connectors and wires compared to the related art. As a result, the production cost of the liquid crystal display device is reduced.

It will be apparent to those skilled in the art that various modifications and variations can be made in the backlight assembly for a liquid crystal display device of the present invention without departing from the spirit or scope of the invention. Thus, it is intended that the present invention cover the modifications and variations of this invention provided they come within the scope of the appended claims and their equivalents.

What is claimed is:

1. A backlight assembly for a liquid crystal display device comprising:

an LED backlight unit including a plurality of light emitting diode strings coupled to a plurality of current balancing circuits;

a backlight driver including a light emitting diode driver that supplies current to the light emitting diode strings;

a first printed circuit board having the LED backlight unit formed thereon;

a second printed circuit board having the light emitting diode driver formed thereon; and a single connector electrically connecting the plurality of current balancing circuits on the first printed circuit board to the light emitting diode driver on the second printed circuit board, wherein each current from the light emitting diode strings is fed back to the light emitting diode driver through the single connector.

2. The backlight assembly according to claim 1, wherein the current balancing circuits are connected to the single connector in parallel.

3. The backlight assembly according to claim 1, wherein the single connector includes:

a first wire line to pass current to the light emitting diode strings, a second wire line to pass current from the light emitting diode strings to the light emitting diode driver, a third wire line to supply a reference voltage from the light emitting diode driver to the plurality of current balancing circuits, and a fourth wire line to supply a ground voltage from the light emitting diode driver to the plurality of current balancing circuits.

4. The backlight assembly according to claim 1, wherein each of the plurality of light emitting diode strings includes a plurality of light emitting diodes connected in series.

5. The backlight assembly according to claim 1, wherein each current balancing circuit of the plurality of current balancing circuits is connected directly to only one light emitting diode string of the plurality of light emitting diode strings.

6. A backlight assembly for a liquid crystal display device comprising:

a plurality of LED backlight units, each LED backlight unit including a plurality of light emitting diode strings coupled to a plurality of current balancing circuits;

a backlight driver including a light emitting diode driver that supplies currents to the light emitting diode strings;

a plurality of first printed circuit boards each having one of the plurality of LED backlight units formed thereon;

a second printed circuit board having the light emitting diode driver formed thereon; and a plurality of connectors electrically connecting the plurality of current balancing circuits to the light emitting diode driver, wherein each of the plurality of connectors is disposed between each of the plurality of LED backlight units on each of the plurality of first printed circuit boards and the light emitting diode driver on the second printed circuit board; and wherein each current from the light emitting diode strings in each of the plurality of LED backlight units is fed back to the light emitting diode driver through each of the plurality of connectors.

7. The backlight assembly according to claim 6, wherein the current balancing circuits in one of the LED backlight units are connected to one of the connectors in parallel.

8. The backlight assembly according to claim 6, wherein one of the connectors includes:

a first wire line to pass current to the light emitting diode strings in one of the LED backlight units, a second wire line to pass current from the light emitting diode strings in the one of the LED backlight units to the light emitting diode driver, a third wire line to supply a reference voltage from the light emitting diode driver to the plurality of current balancing circuits in the one of the LED backlight units, and a fourth wire line to supply a ground voltage from the light emitting diode driver to the plurality of current balancing circuits in the one of the LED backlight units.

9. The backlight assembly according to claim 6, wherein the number of connectors equals the number of LED backlight units.

10. The backlight assembly according to claim 6, wherein the number of connectors equals the number of first printed circuit boards.

11. The backlight assembly according to claim 6, wherein each of the plurality of light emitting diode strings includes a plurality of light emitting diodes connected in series.

12. The backlight assembly according to claim 6, wherein each of the plurality of current balancing circuits is connected directly to only one light emitting diode string of the plurality of light emitting diode strings.

* * * * *